United States Patent [19]

Capowski et al.

[11] Patent Number: 4,675,812
[45] Date of Patent: Jun. 23, 1987

[54] PRIORITY CIRCUIT FOR CHANNEL SUBSYSTEM HAVING COMPONENTS WITH DIVERSE AND CHANGING REQUIREMENT FOR SYSTEM RESOURCES

[75] Inventors: Robert S. Capowski, Verbank; Terrence K. Zimmerman, Red Hook, both of N.Y.

[73] Assignee: International Business Machines Corp., Armonk, N.Y.

[21] Appl. No.: 814,010

[22] Filed: Dec. 20, 1985

Related U.S. Application Data

[63] Continuation of Ser. No. 465,953, Feb. 14, 1983, abandoned.

[51] Int. Cl.⁴ .......................... G06F 3/04; G06F 9/18
[52] U.S. Cl. .................................................. 364/200
[58] Field of Search ... 364/200 MS File, 900 MS File

[56] References Cited

U.S. PATENT DOCUMENTS

| | | |
|---|---|---|
| 3,967,247 | 6/1976 | Andersen et al. ............... 364/200 |
| 4,009,470 | 2/1977 | Danilenko et al. ............... 364/200 |
| 4,130,864 | 12/1978 | Schlotterer ............... 364/200 |
| 4,152,764 | 5/1979 | Connors et al. ............... 364/200 |
| 4,181,974 | 1/1980 | Lemay et al. ............... 364/200 |
| 4,374,413 | 2/1983 | Comfort et al. ............... 364/200 |
| 4,385,382 | 5/1983 | Goss et al. ............... 364/200 |
| 4,422,142 | 12/1983 | Inaba et al. ............... 364/200 |

*Primary Examiner*—Gareth D. Shaw
*Assistant Examiner*—Daniel K. Dorsey
*Attorney, Agent, or Firm*—W. S. Robertson

[57] ABSTRACT

A priority circuit handles requests by three components of a data processing system for access to several resources of the system that can be accessed one at a time on each operating cycle of the system. A logic circuit receives requests by the requesters and grants access to one requester on a priority basis. The logic circuit has means for establishing a particular priority sequence, and the priority circuit includes means for stepping the logic circuit through a cycle of different priority sequences. In a repeating cycle of these steps, each requester is given the highest priority at least once. In a specific embodiment, the stepping means is a counter and a cycle is called a counting cycle. The stepping means is responsive to a control code to establish a particular stepping sequence. In a longer sequence, the lowest priority requester is given the highest priority once and higher priority requesters are given the highest priority several times so that in a complete cycle of steps the requesters have a different relative priority. In shorter cycles, the lowest priority requester is still given highest priority once and the higher priority requesters are given highest priority a few times so that in the shorter cycles the lowest priority requester has a higher relative priority. The priority circuit also includes means for matching a request for a resource with the availability of the resource so that a requester contends for priority only if the resource is in fact available.

4 Claims, 3 Drawing Figures

PRIORITY CIRCUIT FOR CHANNEL SUBSYSTEM HAVING COMPONENTS WITH DIVERSE AND CHANGING REQUIREMENT FOR SYSTEM RESOURCES

This is a continuation of application Ser. No. 465,953, filed Feb. 14, 1983, now abandoned.

FIELD OF THE INVENTION

This invention relates generally to data processing apparatus and more specifically to priority circuit for use in the channel subsystem of a data processing system.

RELATED APPLICATIONS

This application is related to an application entitled, "Channel Communications Array" by Blount et al., filed on the same day as this application.

INTRODUCTION

In a data processing system there are many applications where a system resource (such as main memory) has several users (such as channels) that contend for access to the resources. Apparatus that resolves this contention can be called a priority circuit. Although a channel subsystem is a conventional part of a data processing system and is well known, it will be helpful to review of the features and the terminology of a system that particularly illustrates an application for this invention.

In a simple system a single computing engine might issue orders to a disk controller to transfer data and a program into processor store, and the same engine might then execute the program on the data in main store. For a number of reasons there are commonly two separate engines, one for the I/O operations and one for the arithmetic and logic operations for executing a program in main memory. In a system of the type that would use this invention, several computing engines handle different parts of the I/O operation. One of these processors is called an I/O processor or IOP and there are several processors that are called channel processors or CP's.

Generally, the central processor handles the I/O operations that directly relate to a users program and the IOP and the CP's handle the operations of transferring data between the I/O devices and the memory of the central processor. The CP's handle the actual transfers into and out of processor memory, including the operations with the device controllers. The IOP handles general parts of the I/O operation such as communicating with the central processor, scheduling the I/O jobs, and handling the ending status of the CP's. The IOP communicates with the central processor for operations such as getting control blocks that the central processor prepares to begin I/O operations and for reporting status conditions that are handled by the central processor instead of by the IOP. The CP's communicate with the central processor storage for storing data from an I/O device and for fetching data that is to be stored on an I/O device or for fetching channel programs that are executed by the CP's.

The IOP and the CP's also communicate with each other. The IOP signals a particular CP when an I/O job is to be performed and the CP signals the IOP when the job has been completed or when some other general operation is to be performed by the IOP. These communications are commonly carried out over signal wires that run between the IOP and the CP's or by the processor storage.

The description of the I/O subsystem can be simplified by introducing terminology from a specific system that would use the priority circuit of this invention. In this system, a large number of CP's communicate with processor memory through a system of buffer memories that are arranged in an upwardly pointing funnel shape with a succession of stages in which there are fewer busses than in the stage below but the busses are either wider or faster.

One stage of this system, called the secondary data stager, has two similar component groups each called a secondary data stager or SDS. The IOP and the two SDS's connect to processor memory and to each other through the uppermost stage which is called the primary data stager or PDS. Thus, contention between the CP's and the IOP for access to main memory can be described in terms of contention between just the IOP and the two SDS's. In this system, the PDS provides the communications path between the IOP and the two SDS's, and these components also contend for access to these interconnecting data paths.

OBJECTS OF THE INVENTION

In the PDS of this I/O subsystem, a priority circuit is required because some of the operations of the CP's have critical timing. When data is being transferred to or from a disk storage device, the data path to main memory is given to the disk controller so that the operation can take place. If the system resources are not available at this point in time for some reason, the operation must be delayed until the disk has completed a revolution. Thus, one object of this invention is to provide a new priority system in which a critical CP operation is unlikely to be delayed because a less critical operation of the IOP is taking place.

Conversely, memory accesses by the IOP are necessary to permit the CP's to begin and complete their operations with little delay. One object of the invention is to prevent a large number of CP's from being delayed because one CP is blocking the IOP from adequate access to main memory. Under different operating conditions, there are changes in the relative needs of the IOP and the SDS's, and a more specific object of this invention is to provide a system that permits an IOP and an SDS (or 2 SDS's) to be given a relative priority on a selectable basis.

SUMMARY OF THE INVENTION

This invention provides a priority circuit that permits a selectable relative priority between the SDS's and the IOP for access to the system resources. An SDS or the IOP signals a request for a particular resource. Each resource conventionally provides a busy/available signal. In a first stage of the priority circuit the requests for particular resources are matched with the availability of these resources, and requests are signalled only for the contenders for resources that are available. In a second stage of the circuit, access is granted to the requester having the highest priority. The sequence of priority for the three contenders is changed in a cycle that contains a variable number of steps. The lowest priority contender, the IOP, is given highest priority in one of the steps, and top priority alternates between the two SDS's on the other cycles. The number of steps is a relatively low priority and in shorter cycles the IOP receives relatively higher priority or achieves substantially equal priority with the SDS's.

In the specific circuit that will be described, a counter is arranged to count through a full cycle of seven steps or through a smaller number of steps. Each step has a particular sequence of priority.

THE DRAWING

THE PREFERRED SYSTEM

Figure 1:
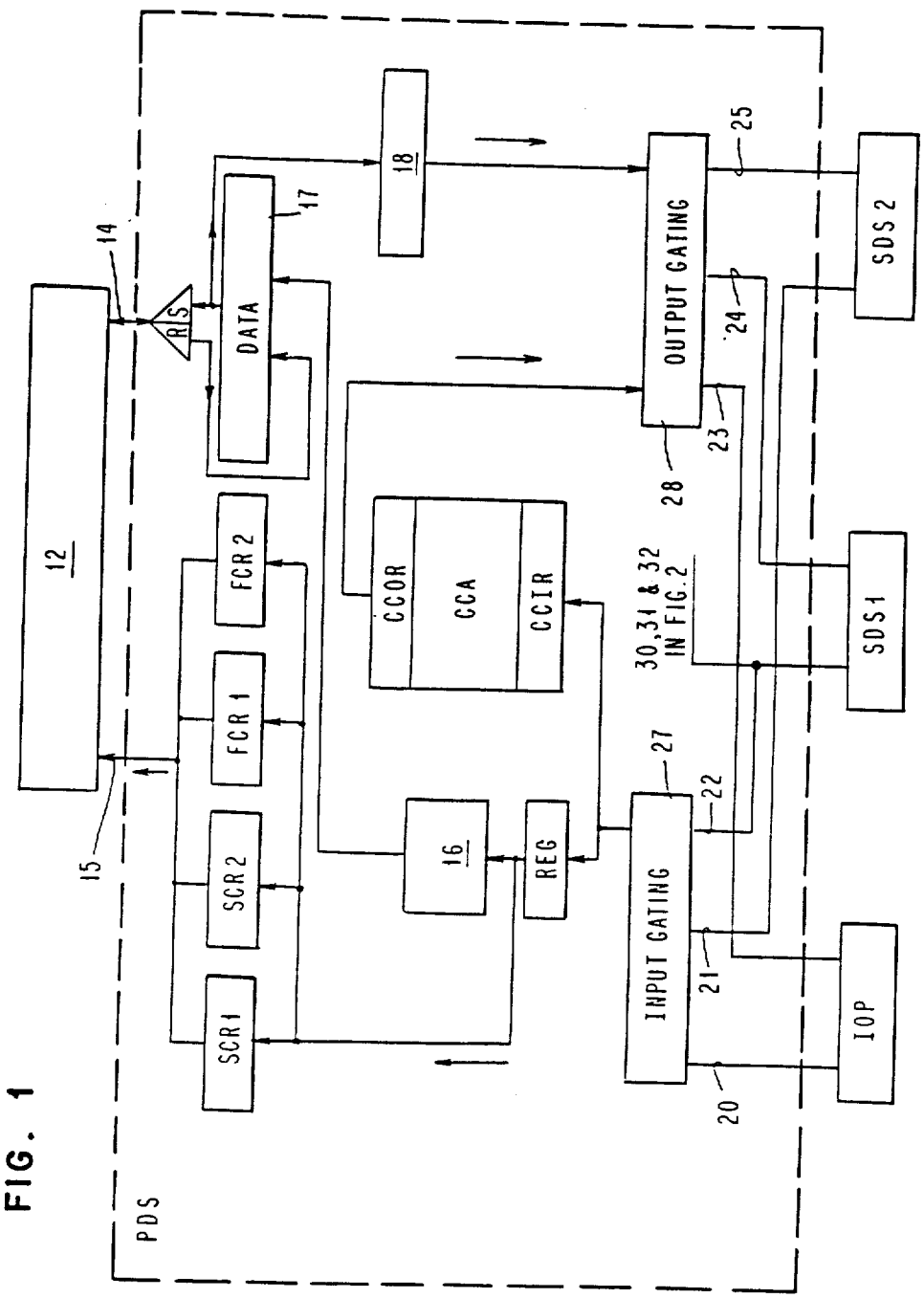
FIG. 1 is a block diagram of a primary data stager and related components of a data processing system.

Introduction—FIG. 1

FIG. 1 shows a central processor complex that includes a central processor, a processor memory, and a circuit that controls access to the memory by the processor and by the I/O subsystem. The invention is useful with a wide variety of data processing systems, and in FIG. 1 these components are represented by a functional block 12. The IOP and SDS1 and SDS2 which have been described earlier are also represented by functional blocks.

A primary data stager PDS is connected to the memory controller by a bidirectional data bus 14 and by an address and control bus 15. A data buffer 16 and a data register 17 are connected in the path of the data bus 14 for input to the processor and data registers 17 and 18 are connected in the path for output from the processor. Store request registers SCR1 and SCR2 and fetch request registers FCR1 and FCR2 are connected in the path of address and control bus 15 to the processor.

Data is transferred on memory bus 14 on successive cycles of the system operations (unless there is no pending transfer). On a stone cycle, data from register 17 are placed on bus 14 and the associated address and control information from register SCR1 or SCR2 are placed on bus 15. On fetch cycles, addresses and other information from FCR1 or FCR2 are placed on bus 15 and subsequently data is transferred on memory bus 14 to register 17.

The priority circuit that will be described controls access by the IOP and the SDS's to SCR 1 and 2 and FCR 1 and 2 and the other components operate according to the contents of these registers without regard to priority.

The IOP and each SDS are connected to the PDS by separate input buses 20, 21 and 22 and output buses 23, 24, and 25. The three input busses are combined in a circuit 27 and the three output busses are split from a circuit 28. These circuits are conventional and do not require specific description.

The Channel Communicator Array CCA of the application of Blount et al. provides communications between the IOP and the SDS's. The priority circuit of this invention controls access to the data input register CCIR of the CCA.

Figure 2:
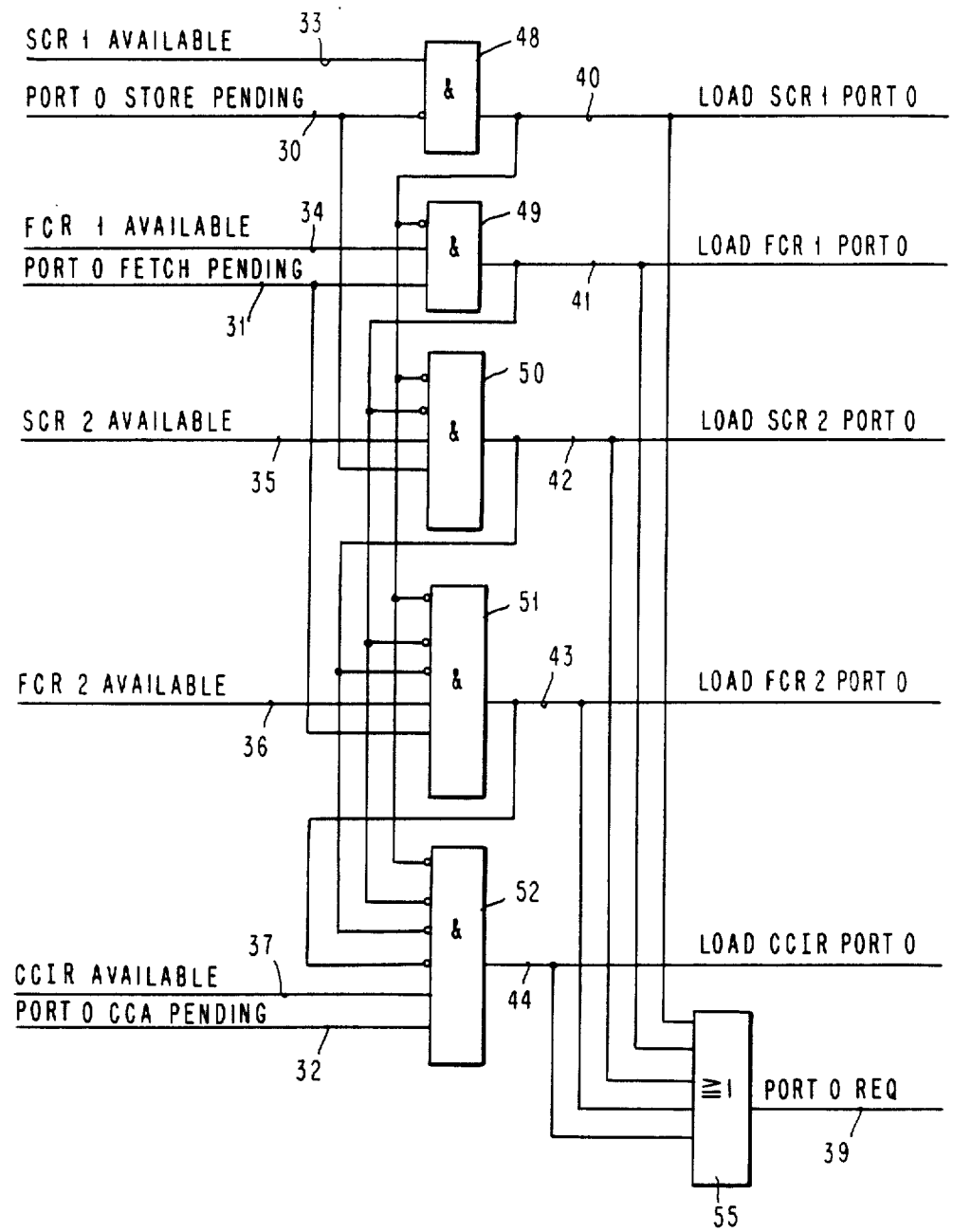
FIG. 2 is a schematic diagram of a circuit in the primary data stager that identifies an available system resource that is matched by one of the requests by a single user.

The Request Matching Circuit of FIG. 2—Introduction

Figure 3:
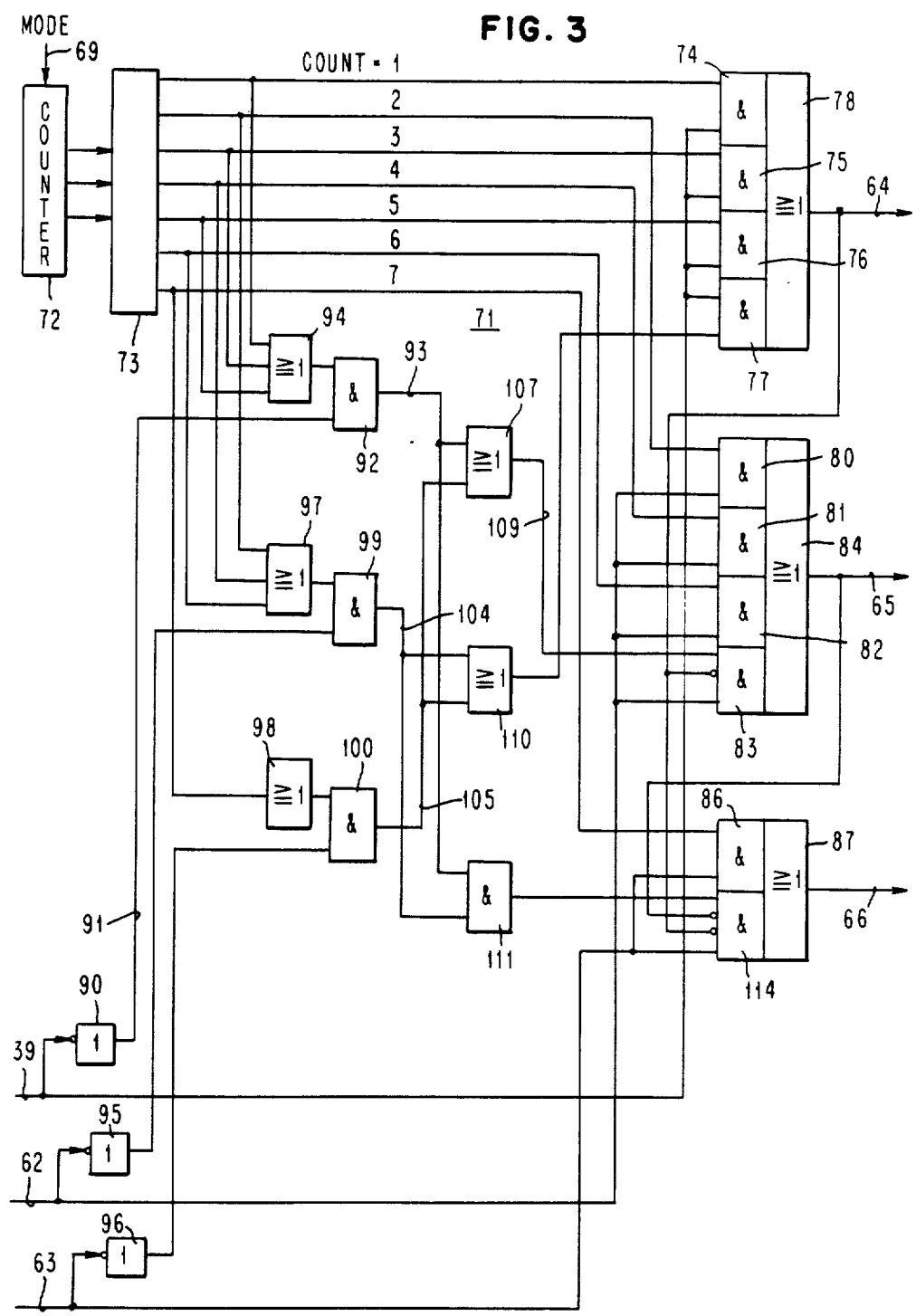
FIG. 3 is a schematic diagram of a circuit that receives requests from the circuit of FIG. 2 and controls access to resources of the primary data stager.

It will be convenient to describe the logic circuits of FIGS. 2 and 3 for the case in which a logical 1 is represented by an up level on a signal line and a logical 0 is represented by a down level.

FIG. 2 shows a port of the PDS that receives one or more requests by SDS1 and matches these requests with the system resources that are available. The PDS has two other ports for SDS2 and the IOP that are identical to the port of FIG. 1 except for differences in their input and output connections. Port 0 receives signals on lines 30, 31, and 32 that identify requests by SDS 1 for access to the system resources: Fetch Request Pending, Store Request Pending, and CCA Operation Pending. It receives corresponding signals on lines 33 to 37 that tell whether the system resources are available or busy: SCR1 Available, SCR2 Available, FCR1 Available, FCR2 Available, and CCA Input Register (CCIR) Available. The other ports receive corresponding request signals and receive the same availability signals. The port produces one output signal on a line 39 that indicates that a request has been made and has been matched, and it produces a control signal on one of lines 40 to 44 for identifying the resource for which a request has been matched.

The Circuit of FIG. 2

The request and availability matching function that has just been described is implemented in the circuit of FIG. 2 by a system of AND logic gates 48–52. The gates are arranged in a column in the drawing to illustrate a hierarchy for accepting a request signal and the corresponding availibility signal. This arrangement is illustrated by gate 48 which receives the signal Port 0 Store Pending and SCR1 Available on lines 30 and 33. On the coincidence of these signals, gate 48 produces an output signal Load SCR1 Port 0 on line 40. Each other gate 49–52 similarly receives a request signal and the corresponding availability signal. In addition, the output 40–43 of each gate except the last gate 52 is connected to inhibit the output of each gate below it in the column. (Circles in the drawing represent a logic invert function which causes a 1 logic value at an output of a control line 40–44 to appear as a 0 logic value at an input for an inhibiting function in an AND gate.)

Lines 30-32 from SDS1 are physically distinct conductors that each carry an individual request signal, and it is possible for SDS1 to have simultaneously pending requests for any of the resources. However, the PDS and the priority circuit of FIG. 3 handle only one request on each system operating cycle. The inhibit connection from the output of an AND gate to the inputs of the lower gates permits pending requests from the SDS to be accepted in a sequence of priority. In the specific circuit of FIG. 2, priority is highest on line 40, LOAD SCR1 PORT 0, and is lowest on line 44, LOAD CCIR PORT 0. On lines 40-43, priority alternates between the SCR's and the FCR's so that they have equal priority to the extent that this can be achieved.

The circuit of FIG. 2 also has an OR circuit 55 that produces a signal Port 0 Request that sigifies that the SDS1 has made a request that has been matched by an available resource. Thus, this signal is a generalized request for an available resource without regard to the specific identification of the resource. As will be described next, the circuit of FIG. 3 receives these generalized requests and grants access to the requestor with the highest priority for the system operating cycle.

The Apparatus of FIG. 3—Introduction

The circuit of FIG. 3 receives the generalized request on line 39 from port 0 which was described in the preceding section, and it receives corresponding signals on lines 62 and 63 from ports 1 and 2. Requests from the three ports are independent and on any particular any system operating cycle in which a request is made the three request lines 39, 62, 63 can have 1 or 0 values in any combination. Unless there are no requests, the circuit of FIG. 3 produces a signal on one of lines 64, 65, or 66 to grant access to one of the ports to whatever resource has been matched in its circuit of FIG. 2. The circuit of FIG. 3 comprises a combinatorial logic network that resolves requests on a priority bases and a set of control lines 71 and a counter 72 and decoder 73 that step an enabling signal along the lines to control the logic network to change the priority with each step. The circuit of FIG. 3 also receives a two bit code 69 and the counter includes means responsive to the mode bits to change its counting sequence to thereby change the relative priority of the IOP and SDS 1 and 2.

The components of the drawing will be introduced as they appear in the description of the following operations.

1. Full priority counting cycle, access requested by the first priority port.
2. Full priority counting cycle, access granted by default to a lower priority port.
3. Several shortened priority counting cycles.

The Logic Gates in the Full Count Cycle

In the priority operations that will be described in this section, the counter operates through a full count of seven steps. On each step the three ports have a particular sequence of priority. The preferred sequence is as follows.

TABLE 1

| Count | Priority Sequence |
|---|---|
| 1 | SDS 1, SDS 2, IOP |
| 2 | SDS 2, SDS 3, IOP |
| 3 | SDS 1, SDS 2, IOP |
| 4 | SDS 2, SDS 1, IOP |
| 5 | SDS 1, SDS 2, IOP |
| 6 | SDS 2, SDS 1, IOP |
| 7 | IOP, SDS 0, SDS 1 |

Thus, it can be seen that in a full count cycle (1) the two SDS's get first priority and second priority in six of the seven steps and (2) the two SDS's have the substantially the same number of first and second priorities. (In the single step of top priority for the IOP, Port 0 is arbitrarily given second priority and Port 1 is assigned third priority. To look ahead in this description, the relative priority of the SDS's and the IOP depends on the length of the counting cycle, and means is provided to shorten the count in a way that changes the relative priority and keeps the priority of Ports 0 and 1 closely equal.

Suppose that the counter has produced a 1 logic level signal on its output line Count=1 and that a there is a 1 logic level on line 39 that signifies that Port 0 has a request to access an available resource. In this situation, an AND gate 74 receives the request from Port 0 on line 39 and the signal Count=1 and in response to the coincidence of these signals it cooperates with an OR gate 78 to produce the enabling signal for Port 0 on line 64.

Similarly, AND gates 75 and 76 receive the signals Count=3 and Count=5 and cooperate with OR gate 78 to grant a request by Port 0 on counts 3 and 5 of the counting cycle. (AND gate 77 will be described later.)

AND gates 80–82 and OR gate 84 are similarly arranged to grant priority to Port 1 on line 65 on the coincidence of a request by Port 1 on line 62 and the signals Count=2, 4, or 6. Similarly, and AND gate 86 and an OR gate 87 grant priority to Port 2 on line 66 on a request by Port 2 on line 63 for Count=7.

The Default Priority Operation

Suppose that Count=1 and that Port 1 has made a request but that Port 0 has not made a request. The circuit of FIG. 3 operates to grant priority by default to Port 1, as is set out in Table 1. In some respects the components for all default conditions are similar, and these components will be described as the operation is described for the default from Port 0 to Port 1. In other respects the components reflect the asymmetry of Table 1 and will be described separately.

In this example, AND gates 74–76 in the circuit for Port 0 are inhibited by the down level of the signal on line 39. AND gates 80–82 for Port 1 are inhibited by the down levels of the signals Count=2, 4 or 6. As will be explained next, AND gate 83 responds to its three input signals to produce a grant signal at the output 65 of OR gate 84.

An Invert circuit 90 inverts the request from Port 0 on line 39 to produce a signal on a line 91, No Request From Port 0. An AND gate 92 responds to this signal and to the signal Count=1 to produce an output on line 93, Default from Port 0. An OR gate 94 transmits the signal Count=1 to AND gate 92 and similarly receives the signals Count=3 and Count=5 which identify other steps in which Port 0 has first priority and conversely identify times for default priority from Port 0. Similarly, Invert circuits 95, 96, OR gates 97, 98 and AND gates 99 and 100 form default signals on lines 104 and 105 for steps in which Port 1 or Port 2 would otherwise have first priority.

An OR gate 107 receives the signal Default from Port 0 priority from gate 92 and it also receives the corresponding signal Default from Port 2 on line 105 and it produces an output on a line 109 that signifies that either Port 0 or Port 2 (or both) have defaulted. OR gates 110 and 111 form corresponding signals that signify that a default has occurred in the combination Ports 1 or 2 or Ports 0 or 1.

AND gate 77 for Port 0 receives the output of OR gate 110, and a request by Port 0 on line 39 produces a grant signal on line 64 in any case of default from first priority by any other port.

AND gate 83 for Port 1 receives the default signal from OR gate 107 but it also receives an inhibiting input from OR gate 78 if Port 0 has made a request. This combination of signals is logically equivalent to ((Step 1, 3, 5) AND Not (Request by Port 0)) OR (Step 7 AND Not (request by Port 0 OR Port 2)). Thus, the default priority is port 0, 1, 2.

AND gate 114 for Port 2 receives the signal for a default from either Port 0 or Port 1 from OR gate 111 and it also receives inhibiting inputs from lines 64 and 65 that signify by an up level after inversion that a request has not been granted to either Port 0 or Port 1. This combination of signals is logically equivalent to ((Step 1, 3, or 5) AND NOT (Request by Port 0)) OR (Step 2, 4 or 6) AND NOT (Request by Port 1)).

Other Count Cycles

Table 2 shows the counting sequence for counting cycles 3, 4, and 5 steps and also shows the mode control bits for all four counting sequences.

TABLE 2

| Priority Register | Counter Sequence |
|---|---|
| 00 | 1, 4, 7 |
| 01 | 1, 3, 4, 7 |
| 10 | 1, 2, 3, 4, 7 |
| 11 | (See Table 1) |

In the sequence established by mode bits 00, Port 0 and Port 1 receives first or second priority on two of the three steps. Similarly, in the sequence of mode bits 01, Port 0 and Port 1 receive first or second priority on three of the four steps. In each sequence, the relative priority between ports 0 and 1 is made slightly asymmetrical by the single step in which Port 2 has first priority, and in the sequence for mode bits 01 the relative priority is made somewhat more unsymmetrical by the fact that there are an even number of total count steps and an odd number of steps to be divided between ports 0 and 1. This asymmetry will ordinarily not be apparent to a user of the system.

The Counter and the Mode Selecting Operation

The preferred counter is a simple series of three interconnected latch stages with controlled interstage coupling that selectively cause the latch to advance from an existing count to a selected next count. For example, when the counter is controlled by mode bits 11, the latch advances from count 100 (decimal 4) to count 101 (decimal 5) by the familiar operation of interstage coupling that flips the rightmost bit and conditionally flips certain adjacent bits. Similarly, in modes 00, 01 or 10, the counter advances from count 100 to count 111 (decimal 7) by flipping to two rightmost bits. Counters for various sequences are well known and will be readily understood from these examples.

From a more general standpoint, a counter is a sequential circuit, that responds to a stepping signal that is formed from a clock of the I/O subsystem, and it responds also to its existing state to advance to the next counting step in the sequence. A wide variety of devices provide this general function.

Other Embodiments

The description of the specific apparatus of the drawing has included generalizing examples and comments, and those skilled in the art will find that the invention is useful in many applications with various modifications within the spirit of the invention and the scope of the claims.

Having thus described our invention, what we claim as new, and desired to secure by Letters Patent is:

1. A priority circuit for granting a system resource to one of a plurality of requesters during a system operating cycle, said requesters including a first and a second higher priority requester and a lower priority requester, each of said requesters having means for signaling a request, comprising, a plurality of signal lines including at least one signal line for each requester and including more than one signal line for each higher priority requester, means operable on each said system operating cycle for producing a signal on a selected one of said signal lines, a plurality of logic means, each associated with one of said requesters, means connecting each of said logic means to said one signal line and any other signal line for the associated requester, each said logic means including means responsive to the coincidence of a request signal by the associated requester and a signal on one of the signal lines to which the logic means is connected to signal a grant of one of said system resources to the associated requester.

means providing a signal to said signal producing means for defining a relative priority among said requesters, and sequential circuit means in said signal producing means responsive to said relative priority signal for producing said signals on said signal lines in a first predetermined cycle extending over a number of system operating cycles equal to the number of said signal lines in which first cycle each signal line carries a signal or in a predetermined second cycle extending over a number of system operating cycles less than the number of said signal lines in which certain of said signal lines for said higher priority requesters do not carry a signal, whereby said higher priority requesters receive access more frequently during said first cycle than during said second cycle, and means for granting priority to another of said requesters in the absence of said coincidence of a request and a signal on a corresponding one of said signal line.

2. A priority circuit for granting a system resource to one of a plurality of requesters during a system operating cycle, said requesters including a first and a second higher priority requester and a lower priority requester, comprising, circuit means for each requester for matching requests for access to one or more resources with the availability of said resources, and means for signaling a general request for the associated requester when a match has been found, means responsive to the general request signals for each of the requesters for granting access to one requester, comprising, a plurality of signal lines including at least one signal line for each requester and including more than one signal line for each higher priority requester, means operable on each said system operating cycle for producing a signal on a selected one of said signal lines, a plurality of logic means, each associated with one of said requesters, means connecting each of said logic means to said one signal line and any other signal line for the associated requester, each said logic means including means responsive to the coincidence of a request signal by the associated requester and a signal on one of the signal lines to which the logic means is connected to signal a grant of one of said system resources to the associated requester, means providing a signal to said signal producing means for defining a relative priority among said requesters, and sequential circuit means in said signal producing means responsive to said relative priority signal for producing said signals on said signal lines in a first predetermined cycle extending over a number of system operating cycles equal to the number of said signal lines in which first cycle each signal line carries a signal or in a predetermined second cycle extending over a number of system operating cycles less than the number of said signal lines in which second cycle certain of said signal lines for said higher priority requesters do not carry a signal, whereby said higher priority requesters receive access more frequently during said first cycle than during said second cycle, and means for granting priority to another of said requesters in the absence of said coincidence of a request and a signal on a corresponding one of said signal lines.

3. The circuit of claim 2 wherein said means responsive to said relative priority signal includes means for changing the sequence of states in said sequential circuit.

4. The circuit of claim 3 wherein said means responsive to said relative priority signal includes means for receiving a multi-bit code defining the sequence of states.